United States Patent [19]

Chastang et al.

[11] 4,428,676
[45] Jan. 31, 1984

[54] OPTICAL SYSTEM FOR OBLIQUE VIEWING

[75] Inventors: Jean C. A. Chastang, Mahopac; Robert F. Koerner, Wappingers Falls, both of N.Y.

[73] Assignee: International Business Machines Corporation, Armonk, N.Y.

[21] Appl. No.: 314,320

[22] Filed: Oct. 23, 1981

[51] Int. Cl.³ ............................................. G03B 21/00
[52] U.S. Cl. .............................. 356/354; 350/162.17; 350/162.23; 353/70
[58] Field of Search .............................. 356/379, 354; 350/162.17, 162.23; 353/69, 70

[56] References Cited

U.S. PATENT DOCUMENTS 3,253,505  5/1966  Miller ..................................... 88/24
3,584,948  6/1971  Herriott ......................... 350/162.17
3,787,117  1/1974  Watkins ............................... 356/354

OTHER PUBLICATIONS

IBM Technical Disclosure Bulletin, vol. 22, No. 9, Feb. 1980, p. 4068 "Inspection Technique for Solder Reflow Pad Height/Volume".

Primary Examiner—R. A. Rosenberger
Attorney, Agent, or Firm—Joseph E. Kieninger

[57] ABSTRACT

An optical system for the oblique viewing of an object includes a specific embodiment for quantitatively determining the volume of solder mounds on chips and wafers without the introduction of keystone distortion and anamorphosis. The optical system includes means for directing an image of the solder mounds at an angle to a diffraction grating to provide a diffracted beam normal to the grating. The diffracted beam is then processed in a conventional manner to yield the sought-after information. In a preferred embodiment the directing means is an afocal lens system having a magnification of one.

6 Claims, 3 Drawing Figures

OPTICAL SYSTEM FOR OBLIQUE VIEWING

DESCRIPTION

1. Technical Field

This invention relates to optical systems and more particularly to an optical system for oblique viewing and quantitatively determining the volume of solder mounds on chips on wafers.

2. Background Art

The solder reflow joining technology is the process of joining chips to substrates. Lead-tin pads or solder mounds are evaporated on the connecting via holes of the chip. There may be more than 100 pads on one chip. In order to insure proper joining of the chip to the substrate, pads must meet minimum and maximum criteria for height/volume.

The pad volume information must be derived from a suitable image of the array. One inspection system is based on an image analyzer which measures pads with a video camera placed directly above the array. This method which assumes a spherical shape for each pad, measures the diameter of the pad and computes the volume thereof. The height of the pad is not taken into account. A more correct approach to volume assessment should include information about the height. In addition to not being highly accurate, this method requires a prohibitively long period of time.

An alternate approach proposed by Ross and Townsend in the IBM Technical Disclosure Bulletin, Vol. 22, No. 9, February 1980, page 4068, was based on the examination of the shadow cast by each pad when the array is illuminated at an oblique incidence. The height/volume of each pad was derived from the area and dimensions of the corresponding shadow. Although this method provided information regarding the height, it was not suitable because the shadows presented a very poor contrast with respect to the background due to depth of focus and resolution problems.

In related technology, Miller in U.S. Pat. No. 3,253,505 described an optical system for the projection of images onto inclined screens. These projection systems were to illuminate or compensate for the keystone distortion which normally results from the mere act of projecting onto an inclined screen. He employed director structures whose purposes were to redirect the light towards a second optical system. These director structures were a reflector or a refractor and, as described in his preferred embodiments, was a Fresnel type of mirror or lens. There is no evidence that such a system as described will work and there appears to be scientific evidence that Keystone distortion introduced by one optical system cannot usually be eliminated for the most part by introducing the opposite distortion by a second system. Whereas this may be done in certain applications, this approach is not suitable for high resolution applications.

SUMMARY OF THE INVENTION

It is a primary object of this invention to provide an optical system for oblique viewing.

It is another object of this invention to provide an optical system for high resolution oblique viewing.

It is another object of this invention to provide an improved optical system for determining the volume of solder mounds on chips and wafers.

It is another object of this invention to provide an optical system for viewing mounds of solder on chips and wafers that is distortion free.

It is still another object of this invention to provide an optical system for the inspection of solder mounds that are illuminated at an oblique incidence.

These and other objects of this invention are accomplished by an optical system which allows one to observe an object at an angle and obtain a distortion-free image. An application of this invention is an optical system for quantitatively determining the volume of solder mounds on chips and wafers without the introduction of keystone distortion and anamorphosis. The optical system includes means for directing the image of the solder mounds at an angle to a diffraction grating projection screen to provide a diffracted beam normal to the grating. In a preferred embodiment a light source directs a beam at an angle of 45° to a chip having solder mounds thereon. The reflected light is then passed through a focal optical system having a magnification of minus one which directs the light along an axis which makes an angle of about 45° with a projection screen which is an optical grating. The optical grating in turn diffracts the light at an angle normal thereto. The light diffracted by the optical grating is observed at a 3× magnification and focused onto the photocathode of a TV camera. The optical axis of the TV camera lens is normal to the optical grating. The image of the pad array, or chip site, is reviewed by standard techniques to determine the size and volume of the pads based upon the size of the shadows observed.

Other objects and advantages of the invention will be apparent from the following detailed description wherein a preferred embodiment of the present invention is clearly shown.

DETAILED DESCRIPTION OF THE INVENTION

Figure 1:
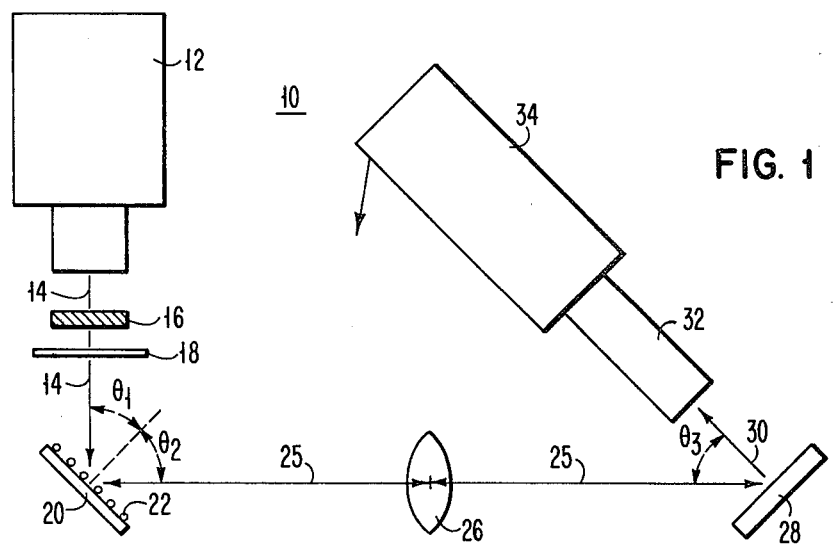
FIG. 1 is a schematic view of one embodiment of the optical system in accordance with this invention.

In accordance with a specific embodiment of this invention as shown in FIG. 1, the optical system 10 includes illuminator 12 which provides the source of light. A non-limiting example of an illuminator 12 is a projector lamp. A beam of light 14 from the illuminator 12 passes through a dark red filter 16 and through a diffuser 18 to strike the chip 20 having the solder mounds 22 thereon. The filter 16 and diffuser 18 are optional elements of the broad inventive concept only when the illuminator 12 is a monochromatic light source, for example, sodium. When the illuminator 12 is a non-monochromatic light source, the filter 16 and diffuser 18 must be used.

Figure 2:
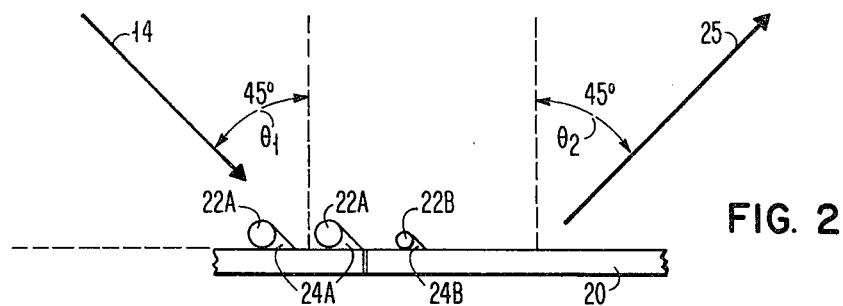
FIG. 2 is an enlarged side view of a beam of light having an oblique incidence to the solder mounds on the chip of FIG. 1.

An enlarged view of the light 14 striking the chip 20 is shown in FIG. 2. The beam of light 14 strikes a chip and solder mounds 22A and 22B at an angle $\theta_1$ which in this case is 45°. While $\theta_1$ in this example is 45° and is a preferred angle, this angle may vary from about 30° to 60° or more depending on the particular application. Solder mounds or pads 22A are larger than solder mound 22B and, accordingly, the shadows 24A are larger than the shadow 24B. Since the chip 20 is quite specular, substantially all of the incident light 14 is reflected as light beam 25 and very little light is scattered in the direction perpendicular to the plane of the pad array, the direction in which one may have expected to carry out the subsequent observation in imaging of the array. The reflected light 25 makes an angle of $\theta_2$ with the perpendicular to the chip 20. $\theta_2$ is equal to $\theta_1$ and in this case $\theta_2$ is 45°. Since the reflected light 25 is used in the imaging process instead of being discarded, the contrast of the shadows 24A and 24B with respect to the background is now excellent.

As shown in FIG. 2, a lens 26 is positioned in the path of the reflected beam 25 so that the axis of the lens is parallel to the reflected beam 25. The lens 26 images the solder mound array onto a scattering screen 28 with a magnification of 1×. It is essential that the magnification be minus 1× (unity) for it is only in this case that when the object is tilted with respect to the optical axis, that the image which is equally tilted but in the opposite direction, does not present any anamorphosis and keystone distortion. An example of this arrangement is to position of 150 MM lens 26 with a magnification of minus 1×300 MM from the chip 22 and 300 MM from the projection screen 28. While the lens 26 is an example of a dioptric system, it is possible to substitute a catadioptric system for the lens 26. The lens 26 may also be replaced in certain applications with an afocal optical system. In all cases the magnification of the system must be one (absolute value).

The projection screen 28 is a diffraction grating. The period of the grating must be such that if the incident beam 25 makes an angle $\theta_3$ with the normal to the grating 28 that the diffracted beam 30 should be parallel with it. This relationship is expressed by the formula $a = \lambda/\sin \theta_3$ where a is the period and $\lambda$ represents the wavelength. A commonly available grating period is 0.83 microns (1200 lines per mm) and when $\theta_3$ equals 45° (sine $\theta_3 = 0.707$), then a satisfactory wavelength, $\lambda$, would be equal to 0.6 microns. Another example of a suitable combination involves a grating having a period, a, of 1800 lines per mm, a $\theta_3$ to 60° and a wavelength $\lambda$ equal to 0.5 microns. The gratings described above are assumed to be reflection gratings. However, transmission gratings may also be used. The optical arrangement for observation is changed accordingly.

The images of the solder mound array that is reflected by the grating 28 as beam 30 is magnified 3× by a telephoto lens 32 and focused onto the photocathode (not shown) of the TV camera 34. The optical axis of the TV camera lens 34 is normal to the screen 28.

Figure 3:
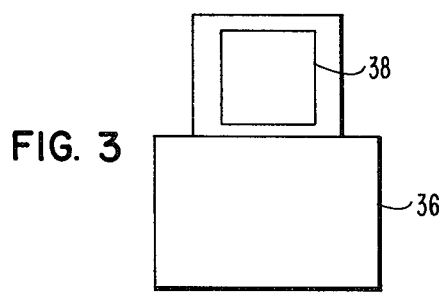
FIG. 3 is a schematic view of the viewing portion associated with the optical system of FIG. 1.

The digital TV camera 34 shown in FIG. 2 is connected to a digital image analyzer 36 as shown in FIG. 3. The image analyzer 36 is connected to a display screen 38 on which the chip image is shown. By measuring the appropriate solder mound images onto the display screen 38, an accurate and quick determination can be made of the volume of the mound which includes the benefit of the height parameter which causes the shadow on the image. This optical system permits a sample to be observed as if in a perpendicular fashion when only oblique examination is possible. It also makes practical a high volume inspection scheme that is more accurate than prior art methods.

The optical system of this invention allows a person to observe an object at an angle and obtain a keystone distortion and an anamorphosis-free, high resolution image. This optical system is useful whenever conventional perpendicular observation of a sample or object is not feasible. The applications of this invention is very broad since countless situations arise where such an optical system could be used.

While I have illustrated and described a preferred embodiment of my invention, it is understood that I do not limit myself to the precise construction herein disclosed, and the right is reserved to all changes and modifications coming within the scope of the invention as defined in the appended claims.

I claim:

1. An optical system for the oblique viewing of a substrate comprising
means for reflecting an image of the surface of the substrate at a first angle of $\theta_2$ with the perpendicular to the substrate,
a diffraction grating,
directing means for projecting said reflected image on said grating at a second angle of $\theta_3$ with the perpendicular to said grating to provide a diffracted beam normal to said grating, said grating having a period $a = \lambda/\sin \theta$ where $\lambda$ is the wavelength of the diffracted beam, said directing means providing a magnification of one,
lens means for projecting said diffracted beam, and
means for detecting said projected diffracted beam wherein a high resolution distortion-free image of said substrate is obtained.

2. The optical system of claim 1 wherein said detecting means comprises means to analyze the contrast in the image of said projected diffracted beam.

3. An optical system as described in claim 1 wherein said directing means is a dioptric system.

4. An optical system as described in claim 1 wherein said directing means is a lens.

5. An optical system as described in claim 1 wherein said directing means is a catadioptric system.

6. An optical system as described in claim 1 wherein said directing means is an afocal optical system.

* * * * *